(12) United States Patent
Green

(10) Patent No.: US 9,627,966 B2
(45) Date of Patent: Apr. 18, 2017

(54) POWER CONVERTER HAVING AN ADVANCED CONTROL IC

(71) Applicant: Infineon Technologies Americas Corp., El Segundo, CA (US)

(72) Inventor: Peter B. Green, Rancho Palos Verdes, CA (US)

(73) Assignee: Infineon Technologies Americas Corp., El Segundo, CA (US)

(*) Notice: Subject to any disclaimer, the term of this patent is extended or adjusted under 35 U.S.C. 154(b) by 667 days.

(21) Appl. No.: 13/666,303

(22) Filed: Nov. 1, 2012

(65) Prior Publication Data

US 2013/0264968 A1 Oct. 10, 2013

Related U.S. Application Data

(60) Provisional application No. 61/620,841, filed on Apr. 5, 2012.

(51) Int. Cl.
| | | |
|---|---|---|
| *H05B 37/02* | (2006.01) | |
| *H02M 3/156* | (2006.01) | |
| *H05B 33/08* | (2006.01) | |
| *H02M 1/00* | (2006.01) | |

(52) U.S. Cl.
CPC ........ *H02M 3/156* (2013.01); *H05B 33/0818* (2013.01); *H02M 2001/0009* (2013.01)

(58) Field of Classification Search
CPC ........... H05B 33/0818; H05B 41/2885; H02M 2001/0009; H02M 3/156
See application file for complete search history.

(56) References Cited

U.S. PATENT DOCUMENTS

| | | | |
|---|---|---|---|
| 7,301,288 B2 | 11/2007 | Green | |
| 2005/0225259 A1* | 10/2005 | Green | 315/224 |

* cited by examiner

*Primary Examiner* — Monica C King
(74) *Attorney, Agent, or Firm* — Slater Matsil, LLP

(57) ABSTRACT

There are disclosed herein various implementations of a power converter having an advanced control integrated circuit (IC). The power converter includes the control IC and a power switch. The control IC includes a driving stage for driving the power switch, and a sensing stage coupled to the driving stage. The sensing stage is configured to produce a control signal for the driving stage based on an output current of the power converter sensed at a high side bus of the power converter.

20 Claims, 3 Drawing Sheets

POWER CONVERTER HAVING AN ADVANCED CONTROL IC

The present application claims the benefit of and priority to a provisional application entitled "Advanced LED Driver IC," Ser. No. 61/620,841 filed on Apr. 5, 2012. The disclosure in this provisional application is hereby incorporated fully by reference into the present application.

BACKGROUND

Power converters are used in a variety of electronic circuits and systems. Many applications, for instance, implement power converters to convert an alternating current (AC) input to a direct current (DC) output. Moreover, buck converters are used to convert a higher direct current (DC) input to a lower DC output. For example, light-emitting diode (LED) drivers based on the buck converter topology are widely used in consumer and industrial lighting applications.

An LED driver may be implemented as a synchronous buck converter including a control integrated circuit (IC) for regulating output current. Use of an average current mode control to regulate the output current between upper and lower current limits is advantageous because such an approach is inherently stable. In order to regulate the output current using an average current mode control, the control IC is typically configured to drive a pair of power switches (e.g., a high side and a low side switch) based on a sense voltage detected at the low side of the LED converter. However, due to market demand for ever more compact and less costly solutions, a power converter, such as an LED driver, including a control IC capable of providing average current mode control in combination with a single power switch is desirable.

SUMMARY

The present disclosure is directed to a power converter having an advanced control integrated circuit (IC), substantially as shown in and/or described in connection with at least one of the figures, and as set forth more completely in the claims.

DETAILED DESCRIPTION

Figure 1:
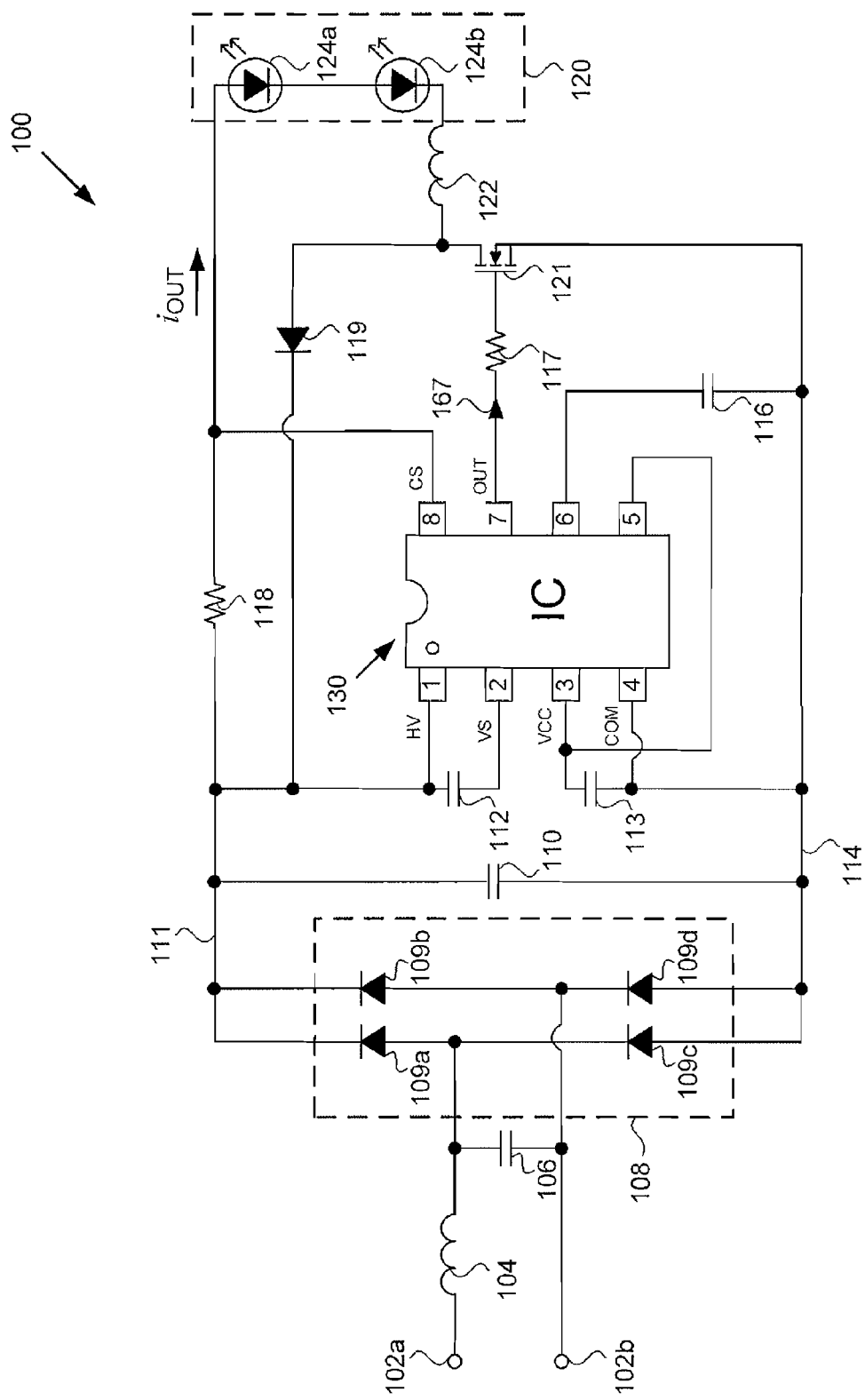
FIG. 1 shows an exemplary implementation of a power converter including an advanced control integrated circuit (IC) and a power switch.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As discussed above, a power converter may be implemented as a buck converter including a control integrated circuit (IC) for regulating an output current to a load. Use of a hysteresis based average current mode control approach to regulate the output current between upper and lower current limits is advantageous for several reasons. For example, such a hysteretic control scheme enables omission of large output capacitors from the power converter design. In addition, controlling output current between upper and lower bounds produces a control scheme that is inherently stable, as well as accurate. The present application discloses a power converter including an advanced control IC capable of advantageously providing hysteresis based average current mode control of the power converter output current using a single power switch.

FIG. 1 shows an exemplary implementation of power converter 100 including control IC 130 and power switch 121, represented as a power metal-oxide-semiconductor field-effect transistor (power MOSFET). As further shown in FIG. 1, power converter 100 is coupled to load 120 including LEDs 124a and 124b, and provides regulated output current $i_{OUT}$ to drive LEDs 124a and 124b.

It is noted that although load 120 is depicted in FIG. 1 as including LEDs, that representation is merely exemplary. Thus, although power converter 100 is shown to be implemented as an LED driver, in other implementations, power converter 100 can be utilized in a wide variety of buck converter applications requiring a regulated output current corresponding to $i_{OUT}$. It is further noted that although power switch 121 is depicted as a power MOSFET in FIG. 1, that representation is also merely exemplary. In other implementations, power switch 121 may be implemented as any suitable power switching device, such as a group IV power MOSFET or insulated-gate bipolar transistor (IGBT), or a group III-V heterostructure field-effect transistor (HFET), for example.

In addition to control IC 130 and power switch 121, power converter 100 includes inputs 102a and 102b, input inductor 104, input capacitor 106, and rectifier block 108 including diodes 109a, 109b, 109c, and 109d. Power converter 100 also includes bus capacitor 110 coupled between high side bus 111 and ground bus 114, as well as sense resistor 118 implemented as part of high side bus 111. Also shown in FIG. 1 are capacitors 112, 113, and 116, switching gate resistor 117, power switch diode 119, power switch inductor 122, and drive signal 167 for power switch 121.

Control IC 130 includes multiple input/output (I/O) pins including high voltage (HV) pin 1, high side supply voltage (VS) pin 2, low side supply voltage (VCC) pin 3, common ground (COM) pin 4, output (OUT) pin 7, and high side current sense (CS) pin 8. Control IC 130 also includes pin 5 externally coupled to VCC pin 3, and pin 6 externally coupled to ground bus 114 through capacitor 116.

Control IC 130 is configured to sense output current $i_{OUT}$ of power converter 100 at high side bus 111 of power converter 100 and to generate drive signal 167 for driving power switch 121 based on the sensed output current $i_{OUT}$. According to the specific implementation shown in FIG. 1, control IC 130 is configured to sense output current $i_{OUT}$ of power converter 100 by comparing a voltage drop across sense resistor 118 of high side bus 111 to an on-chip reference voltage. Control IC 130 is further configured to utilize a hysteretic average current mode control scheme to control power switch 121 and thereby regulate output current $i_{OUT}$ to load 120. Moreover, control IC 130 advantageously enables use of hysteretic average current mode control for regulation of output current $i_{OUT}$ despite power converter 100 including only a single power switch 121.

Figure 2:
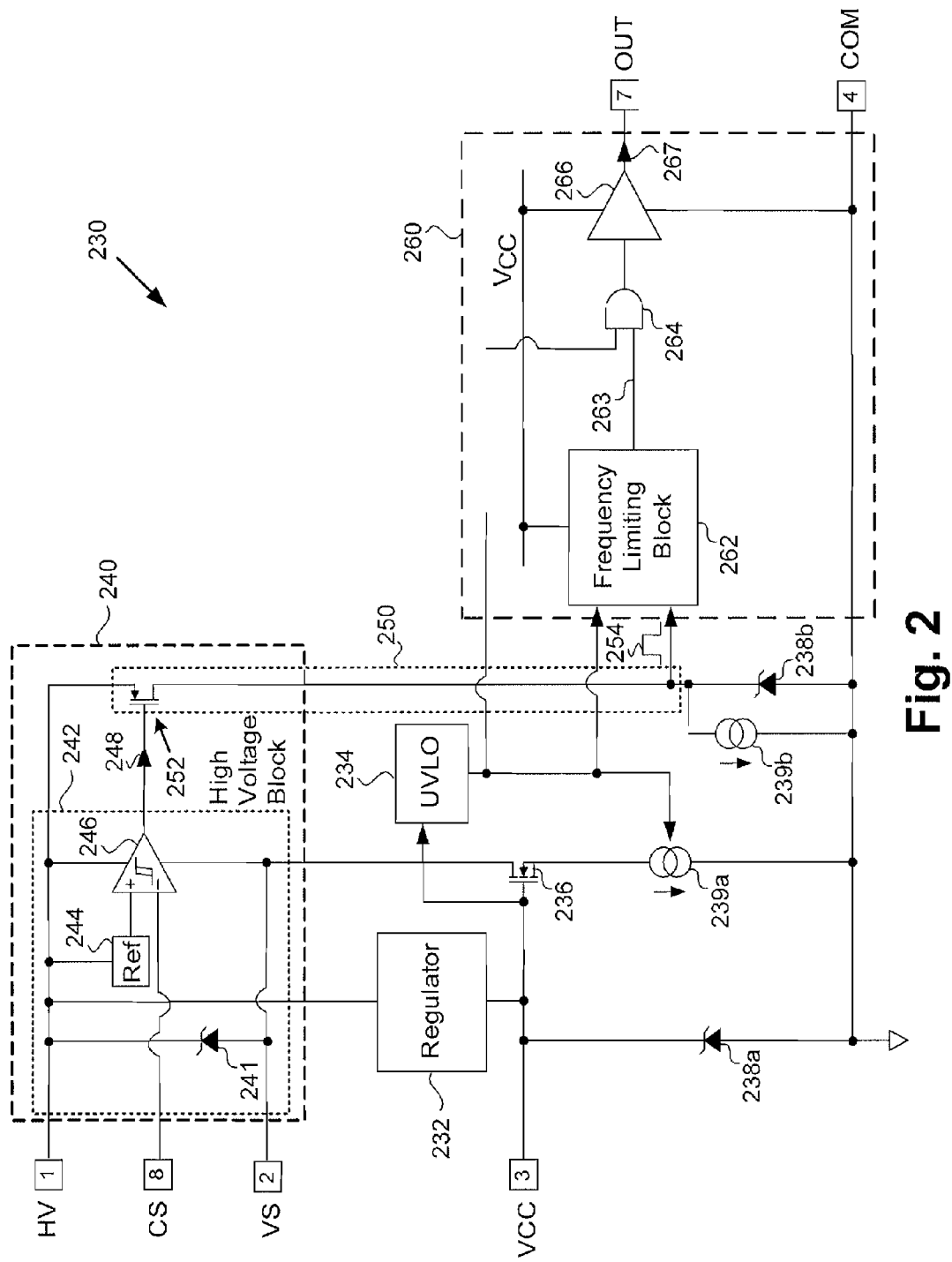
FIG. 2 shows a more detailed exemplary implementation of a portion of the advanced control IC of FIG. 1.

Referring now to FIG. 2, FIG. 2 shows a more detailed exemplary implementation of a portion of control IC 130 in FIG. 1. Thus, control IC 230 providing drive signal 267 and including HV pin 1, VS pin 2, VCC pin 3, COM pin 4, OUT pin 7, and CS pin 8, in FIG. 2, corresponds to control IC 130 providing drive signal 167 and including HV pin 1, VS pin 2, VCC pin 3, COM pin 4, OUT pin 7, and CS pin 8, in FIG. 1. It is noted that the portion of control IC 230 shown in FIG. 2 omits circuitry related to pins 5 and 6, shown in FIG. 1, in the interests of conceptual clarity.

Control IC 230 includes driving stage 260, and sensing stage 242 coupled to driving stage 260 by level shifter 250. As shown in FIG. 2, sensing stage 242 is implemented in high voltage block 240 of control IC 230. Sensing stage 242 is configured to produce control signal 248 for driving stage 260 based on output current $i_{OUT}$ sensed at high side bus 111 of power converter 100, in FIG. 1. Also shown in FIG. 2 are regulator block 232, undervoltage lockout (UVLO) block 234, voltage regulation transistor 236, diodes 238a and 238b, which may be Zener diodes for example, current sources 239a and 239b, and level shifted signal 254.

Sensing stage 242 of high voltage block 240 is connected to HV pin 1, VS pin 2, and CS pin 8 of control IC 230. Sensing stage 242 includes diode 241, shown as a Zener diode in FIG. 2, coupled between HV pin 1 and VS pin 2. Sensing stage 242 also includes hysteretic comparator 246 having one of its inputs coupled to CS pin 8, and another input coupled to HV pin 1 through high reference voltage unit 244. Referring to FIGS. 1 and 2 together, it is noted that sensing stage 242 may be coupled across sense resistor 118 of high side bus 111, through HV pin 1 and CS pin 8, to sense output current $i_{OUT}$ at high side bus 111.

As noted above, sensing stage 242 is implemented in high voltage block 240 of control IC 230. High voltage block 240 is shown as a floating high voltage block having a high voltage rail provided through HV pin 1 and a relative low voltage floating rail provided through VS pin 2. By way of example, HV pin 1 may be at a voltage of approximately two hundred volts (200V) and VS pin 2 may be at a voltage of approximately 185V.

Level shifter 250 includes high voltage transistor 252, shown as a p-channel device in the exemplary representation of FIG. 2. As shown in FIG. 2, high voltage transistor 252 can receive control signal 248 as a gate signal and can produce lower voltage level shifted signal 254, which may be a pulse signal, for example, corresponding to control signal 248.

Driving stage 260 is configured to generate drive signal 267 for driving power switch 121, in FIG. 1, and to provide drive signal 267 through OUT pin 7. It is noted that driving stage 260 is coupled to the gate of power switch 121 through OUT pin 7. In one implementation, driving stage 260 may include frequency limiting block 262 configured to receive level shifted signal 254 from level shifter 250. Driving stage 260 also includes logic gate 264, shown as an AND gate receiving signal 263 from frequency limiting block 262 in FIG. 2, and PWM 266 having its input coupled to logic gate 264 and its output coupled to OUT pin 7 so as to provide drive signal 267 for power switch 121.

Figure 3:
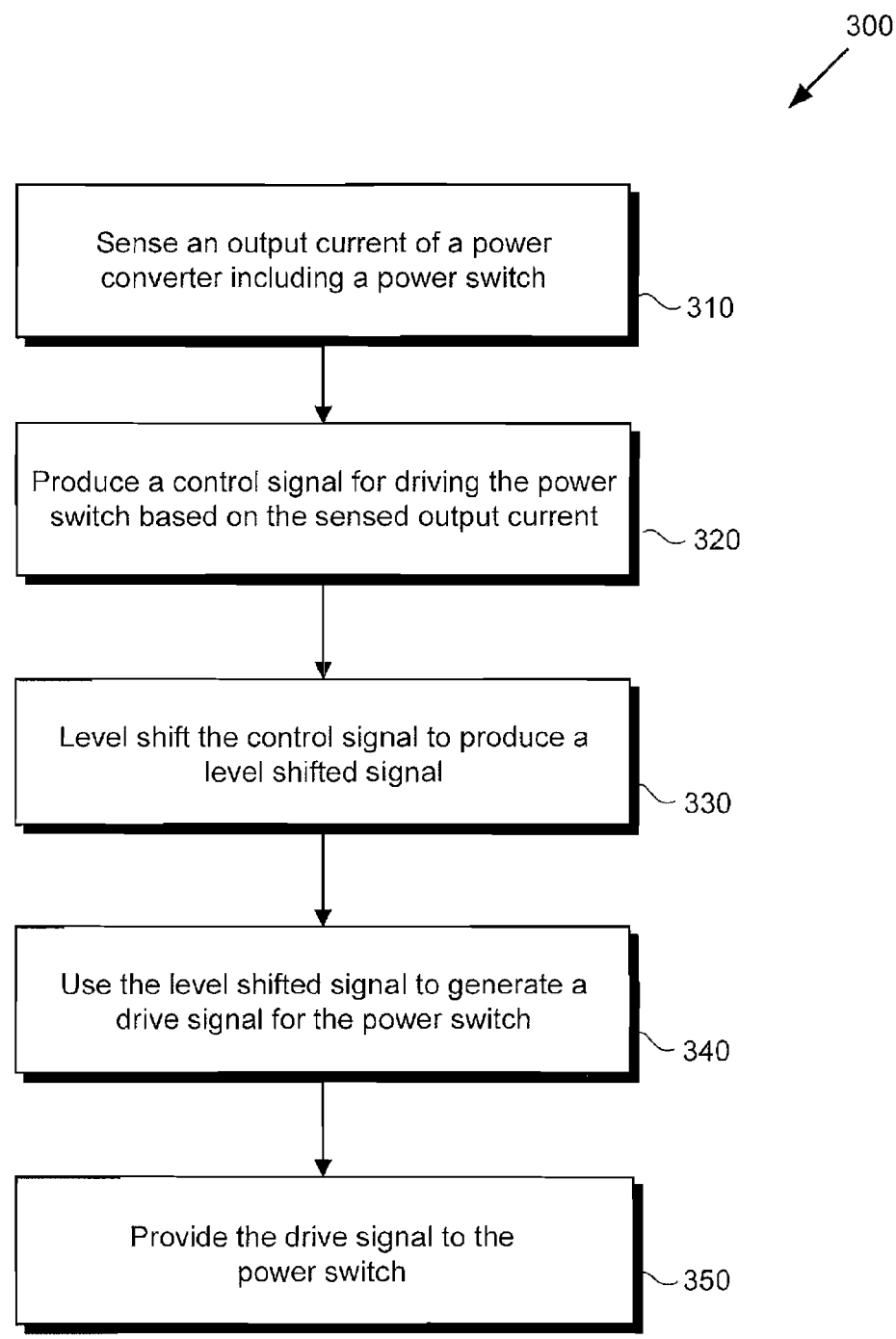
FIG. 3 shows a flowchart presenting an exemplary method for use by an advanced control IC to regulate an output current of a power converter.

FIGS. 1 and 2 will now be further described by reference to FIG. 3. FIG. 3 shows flowchart 300, which presents an exemplary method for use by control IC 130/230 to regulate output current $i_{OUT}$ of power converter 100. With respect to the method outlined in FIG. 3, it is noted that certain details and features have been left out of flowchart 300 that are apparent to a person of ordinary skill in the art.

Referring to flowchart 300, with additional reference to FIGS. 1 and 2, flowchart 300 begins with sensing output current $i_{OUT}$ of power converter 100 including power switch 121 (310). Sensing of output current $i_{OUT}$ may be performed by sensing stage 242 of control IC 230. For example, output current $i_{OUT}$ may be sensed by sensing stage 242 as a differential voltage measured across sense resistor 118 at high side bus 111 of power converter 100 through HV pin 1 and CS pin 8.

Flowchart 300 continues with producing control signal 248 for driving power switch 121 based on the sensed output current $i_{OUT}$ (320). Producing control signal 248 may also be performed by sensing stage 242 of control IC 230, using high reference voltage unit 244 and hysteretic comparator 246.

As shown in FIG. 2, CS pin 8 provides an input to hysteretic comparator 246 corresponding to the voltage drop across sense resistor 118. A high on-chip reference voltage is provided by high reference voltage unit 244 coupled to HV pin 1. The voltage at CS pin 8 is compared to the high on-chip reference voltage provided by high reference voltage unit 244, using hysteretic comparator 246. Hysteretic comparator 246 is implemented so as to produce control signal 248 based on that comparison. With respect to the hysteretic average current mode control provided by control IC 230, the hysteresis range utilized in producing control signal 248 may be predetermined and set so as to balance noise immunity with the desired level of regulation of output current $i_{OUT}$.

Flowchart 300 continues with level shifting of control signal 248 to produce level shifted signal 254 (330). Level shifting of control signal 248 can be performed by level shifter 250, using high voltage transistor 252. As described above, according to the exemplary implementation shown in FIG. 2, high voltage transistor 252 receives control signal 248 as a gate signal and produces lower voltage level shifted signal 254, such as an approximately 10V pulse signal, for example, corresponding to control signal 248.

Flowchart 300 continues with using level shifted signal 254 to generate drive signal 167/267 for power switch 121 (340). Using level shifted signal 254 to generate drive signal 167/267 can be performed by driving stage 260 of control IC 230. For example, level shifted signal 254 may be provided as a direct input to logic gate 264, which may also receive an enable input from UVLO block 234, to control the operation of PWM 266. PWM 266, under the control of logic gate 264, generates drive signal 267 for power switch 121. It is noted that drive signal 267 is generated based on control signal 248 produced by sensing stage 242 and used to produce level shifted signal 254 by level shifter 250.

In some implementations, however, as shown in FIG. 2, the method of flowchart 300 may include limiting a frequency of level shifted signal 254 before generating drive signal 267. That is to say, frequency limiting block 262 may be implemented to condition level shifted signal 254 so as to prevent signal 263 received by logic gate 264 from exceeding a predetermined maximum frequency.

It is noted that, due to the hysteretic nature of the average current mode control implemented by control IC 130/230, the frequency of control signal 248 and level shifted signal 254 corresponding to control signal 248 can vary based on several factors. For example, load 120, the value of power switch inductor 122, and the input voltage at inputs 102a and 102b of power converter 100, are some of the factors that may affect the frequency of control signal 248 and level shifted signal 254. However, approximately at or above some threshold frequency, such as approximately 150 kHz, for example, switching losses and heat generation by power converter 100 may become undesirably high. Consequently, frequency limiting block 262 may be employed to ensure that signal 263, for use by logic gate 264 to control PWM 266, remains below a predetermined frequency threshold, such as 150 kHz.

Flowchart 300 concludes with providing drive signal 167/267 to power switch 121 (350). As shown in FIG. 2, drive signal 267 is generated as an output of PWM 266 and is provided to power switch 121 through OUT pin 7 of control IC 130/230. As a result, power switch 121, under the control of control IC 130/230 provides regulated output current $i_{OUT}$ to load 120.

Thus, the present application discloses a power converter including an advanced control IC. The disclosed power converter may be implemented as a buck converter, such as an LED driver for use in residential or industrial lighting applications. In contrast to conventional implementations, the disclosed control IC is configured to sense an output current of the power converter at a high side bus of the power converter, and to generate a drive signal for a power switch of the power converter based on the sensed output current. According to one implementation, the control IC is configured to sense the output current by comparing a voltage drop across a sense resistor of the power converter high side bus to a high on-chip reference voltage. The disclosed control IC is further configured to utilize a hysteretic average current mode control scheme to control the power switch. In addition, the disclosed control IC advantageously enables use of hysteretic average current mode control for output current regulation in a power converter implemented with only a single power switch, thereby providing stable, accurate current regulation in a compact, low cost solution.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A control integrated circuit (IC) for use in a power converter, the control IC comprising:
   a driving stage configured to drive a power switch;
   a high side current sense pin configured to be coupled to a sense resistor, the sense resistor coupled between a high side bus and the power switch;
   a voltage regulation device; and
   a sensing stage coupled between the high side current sense pin and the driving stage, the sensing stage configured to produce a control signal for the driving stage based on an output current flowing through the sense resistor, wherein
      the sensing stage comprises a comparator with a first input coupled to the high side current sense pin, and a second input coupled to the voltage regulation device.

2. The control IC of claim 1, wherein the sensing stage is coupled across the sense resistor.

3. The control IC of claim 1, wherein said sensing stage is implemented in a high voltage block of said control IC.

4. The control IC of claim 1, further comprising a level shifter coupled between said sensing stage and said driving stage, said level shifter configured to produce a level shifted signal corresponding to said control signal.

5. The control IC of claim 1, wherein said driving stage comprises a frequency limiting block configured to receive a level shifted signal corresponding to said control signal.

6. The control IC of claim 1, wherein said power converter comprises a buck converter.

7. The control IC of claim 1, wherein said power converter is a light-emitting diode (LED) driver.

8. The control IC of claim 1, wherein a load in series with an inductor is coupled between the sense resistor and the power switch.

9. The control IC of claim 8, further comprising the load, wherein the load comprises an LED.

10. The control IC of claim 1, further comprising the power switch.

11. A method comprising:
    sensing an output current of a power converter, the output current flowing through a load; and
    producing a control signal for driving a power switch in the power converter based on the sensed output current, wherein
        the sensing the output current comprises sensing a voltage across a sense resistor coupled between a high side bus and the load, the load coupled between the sense resistor and a ground terminal.

12. The method of claim 11, further comprising level shifting the control signal to produce a level shifted signal for use in generating a drive signal for the power switch.

13. The method of claim 12, further comprising limiting a frequency of the level shifted signal before generating the drive signal.

14. A circuit comprising:
    a power switch coupled between a load and a ground terminal;
    a driving circuit coupled to the power switch and configured to generate a control signal for driving the power switch; and
    a current sensing circuit operatively coupled to the driving circuit, wherein the current sensing circuit is configured to sense a load current configured to flow through the load by sensing a voltage across a sense resistor, the sense resistor coupled between a high side bus and the load.

15. The circuit of claim 14, further comprising a level shifter coupled between the current sensing circuit and the driving circuit.

16. The circuit of claim 14, further comprising the sense resistor.

17. The circuit of claim 14, further comprising the load, wherein the load comprises an LED.

18. The circuit of claim 14, wherein the driving circuit comprises a comparator configured to receive a high voltage reference.

19. The control IC of claim 5, wherein the frequency limiting block is configured to limit a frequency of an output signal of the frequency limiting block to below 150 kHz.

20. The circuit of claim 14, further comprising an inductor coupled between the load and the power switch.

* * * * *